(12) United States Patent
Bini

(10) Patent No.: US 6,959,499 B2
(45) Date of Patent: Nov. 1, 2005

(54) DEVICE AND METHOD FOR MEASURING THE LENGTH OF A FISH

(76) Inventor: Vincent Patrick Bini, 3611 Turtle Run Blvd. #626, Coral Springs, FL (US) 33067

( * ) Notice: Subject to any disclaimer, the term of this patent is extended or adjusted under 35 U.S.C. 154(b) by 0 days.

(21) Appl. No.: 10/783,915

(22) Filed: Feb. 20, 2004

(65) Prior Publication Data

US 2004/0163267 A1 Aug. 26, 2004

Related U.S. Application Data

(60) Provisional application No. 60/448,325, filed on Feb. 20, 2003.

(51) Int. Cl.[7] .............................................. G01B 3/10
(52) U.S. Cl. ............................ 33/511; 33/755; 33/770; 33/833; 43/4
(58) Field of Search ........................ 33/430, 490, 511, 33/549, 555, 755, 757–760, 768, 770, 832, 833; 43/1, 4

(56) References Cited

U.S. PATENT DOCUMENTS

| | | | | |
|---|---|---|---|---|
| 491,733 A | * | 2/1893 | Foster | 33/760 |
| 650,136 A | * | 5/1900 | Runnette | 33/770 |
| 1,011,628 A | * | 12/1911 | Klein | 33/758 |
| 1,017,201 A | * | 2/1912 | Bromley | 33/490 |
| 1,474,804 A | * | 11/1923 | Tyrrell | 33/511 |
| 2,003,893 A | * | 6/1935 | La Pan | 33/761 |
| 2,197,031 A | * | 4/1940 | Davis | 33/759 |
| 3,020,643 A | * | 2/1962 | Moran | 33/759 |
| 3,259,988 A | * | 7/1966 | Lunn | 33/549 |
| 5,097,617 A | * | 3/1992 | Craven | 33/511 |
| 5,113,596 A | * | 5/1992 | Meyers | 33/770 |
| 5,335,421 A | * | 8/1994 | Jones, Jr. | 33/759 |
| 5,339,532 A | * | 8/1994 | O'Keefe | 33/511 |
| 5,526,575 A | * | 6/1996 | Hoover et al. | 33/511 |
| 5,637,838 A | * | 6/1997 | Arey et al. | 33/511 |
| 5,970,620 A | * | 10/1999 | Campbell | 33/511 |
| 6,047,481 A | * | 4/2000 | Bond | 33/768 |
| 6,115,932 A | * | 9/2000 | Fedora | 33/758 |
| 6,223,446 B1 | * | 5/2001 | Potter | 33/764 |
| D448,687 S | * | 10/2001 | Landwerlen | D10/71 |
| 6,415,521 B1 | * | 7/2002 | Schnell | 33/511 |
| 6,546,119 B2 | * | 4/2003 | Ciolli et al. | 382/104 |
| 6,765,155 B1 | * | 7/2004 | Gray | 33/549 |
| 2003/0106254 A1 | * | 6/2003 | Ondusko | 43/4 |
| 2004/0123476 A1 | * | 7/2004 | Pleczynski | 33/511 |

OTHER PUBLICATIONS

Gator Grip 'Golden Rule' Measuring Board, at http://www.eangler.com/eangler/proshop/productdetail.asp?prod_id=2596&dept_id=612, two pages, no date.*

* cited by examiner

Primary Examiner—G. Bradley Bennett
(74) Attorney, Agent, or Firm—Scott D. Smiley; Stephen Bongini; Fleit, Kain, Gibbons, Cutman, Bongini & Bianco P.L.

(57) ABSTRACT

A compact and portable measuring device that is quickly and easily attachable to a fish holding device, at an end of the fish, and provides a visually readable scale, which can be used to easily identify the length of the fish and can later be read in a photograph of the fish and measuring device, even if taken at a distance away from the fish and the device.

20 Claims, 5 Drawing Sheets

DEVICE AND METHOD FOR MEASURING THE LENGTH OF A FISH

RELATED APPLICATION

This application hereby claims priority under 35 U.S.C. 119 to U.S. Provisional Patent Application No. 60/448,325 filed Feb. 20, 2003.

BACKGROUND OF THE INVENTION

1. Field of the Invention

The invention relates primarily to measuring the length of a fish. More specifically, the present invention is directed to a device having visible, clearly defined markings and means of attachment to a fish-holding device, so that the length of the fish can easily and quickly be determined.

2. Description of the Related Art

Measuring devices are well known in the art. Tape measures, yardsticks, and rulers have been in use in the United States for hundreds of years for a practically unlimited number of uses. One specific use of a measuring device is to determine the length of a caught fish.

People who participate in the activity of fishing, often base the determination of their success upon the size of the fish that they catch. It is therefore often desirable to record the size of the fish caught. The size of a fish can be determined by measuring its weight or length. It is, however, a difficult endeavor to measure a fish's length due to the fact that fish are often, among other things, slippery, hard to grip, and non-stationary, i.e., wiggling or jumping.

One prior-art device for measuring the length of a fish is U.S. Pat. No. D448,687 to Landwerlen, commercially know as the "Redfish Board". The Redfish Board is 32" long, made from aircraft aluminum with lines, numbers and letters embossed into the surface, and resembles a rigid yardstick with an "L" shaped bend at one end. The Redfish Board is used by laying a fish on its surface, with one end of the fish touching the "L" portion of the Board, which is the zero mark. One can then look at the other end of the fish and read the embossed marking on the Board, indicating the length of the fish. The Redfish Board, however, has several disadvantages. Since the Redfish Board is 32" long and rigid, it is difficult to carry, store, and use, especially on boats having small areas within which to work. Also, the Redfish board is used in a horizontal plane, which causes it to also suffer from the problem of a live fish moving and sliding either off of the Board or away from the zero mark, causing false readings. Additionally, because the measuring is accomplished by laying the fish on the Board's measuring surface, and fish inherently produce slime, the Redfish Board must be cleaned each time it is used. Finally, the Redfish Board's numbers and letters are small and have low contrast, making them difficult to read without the reader being in close proximity to the Board. If a fisherman were to try to capture the measurement on film, he would have to stand above the Board, hoping the fish wouldn't move away from the zero mark, and take a picture straight down from eye level. Due to the above-mentioned low contrast and small numbers, the exact length of the fish is difficult to capture on the film, even if the fish does remain motionless.

The same manufacturer of the Redfish Board also manufactures similar devices sold under the trade name "Bluwater Measuring Board". The Bluwater Measuring Board is provided in a blue color, and available in lengths of 38" and 42", making them even less portable than the above described Redfish Board. The Bluwater Board suffers from the same difficulty in reading the measurement and recording the length of the fish on film.

Another prior-art device is commercially known as the "Golden Rule" and is similar to the above-mentioned Redfish Board and Bluwater Measuring Board. The Golden Rule is a ruler made of ⅛" anodized gold aluminum with lines, numbers, and letters embossed into the surface. The Golden Rule suffers from all of the above-mentioned disadvantages of the prior-art. Although it is available in lengths of 12", 18", and 22", shorter than the previously mentioned prior-art measuring devices, it is still difficult to store, carry, and use a length of "L" shaped aluminum in those lengths. Additionally, while the shorter length may prove slightly easier to store and use, it is then limited to the size fish that it can measure.

A tape-measure-type device provides an advantage of compact storing area. However, prior art tape-measure-type devices consist of a thin strip containing the numbers and markings, which are small and difficult to read. These prior-art devices also do not provide an easy way to measure from the very tip of one end of the fish to the other. One would have to hold the fish and both ends of the tape measure to get an accurate measurement of the length of the fish. If the tape is made to touch the ends of the fish, the curvature of the body will cause the reading to be inaccurate. Also, due to the size of the markings on the tape, the numbers will not be easily seen in a picture taken of the fish.

SUMMARY OF THE INVENTION

It is accordingly an object of the invention to provide an apparatus and method for quickly, easily, and accurately determining and/or recording the length of a fish, which overcomes the hereinafore-mentioned disadvantages of the heretofore-know devices and methods of this general type.

With the foregoing and other objects in view, there is provided, in accordance with the invention, a device for measuring the length of a fish comprising a foldable tape section having distance indicators along the length of the tape, and a base section attachable to a fish-holding device and to the foldable tape.

With the objects of the invention in view, there is also provided a method of measuring a fish comprising: holding a fish at a first end with a holding device; attaching a measuring device, having a base and a measuring tape, to the holder at the first end of the fish; extending the measuring tape longitudinally in the direction of the body of the fish with the fish being positioned between the tape and an observer; and visually determining the length of the fish by comparing a distal second end of the fish to distance indicators provided on the tape.

In accordance with a further feature of the invention, the base is provided with a groove penetrating completely through the base and extending from an edge of the base toward a center area of the base.

In accordance with an added feature of the invention, the distance indicators are evenly-spaced lines along the length of the tape.

In accordance with yet a further feature of the invention, the distance indicators are incremented numbers.

In accordance with yet an additional feature of the invention, the color of the distance indicators is selected so as to contrast with the color of the tape.

In accordance with again another feature of the invention, the tape is removably attached to the base.

In accordance with again an additional feature of the invention, the tape has a first end and a second end opposite the first end, with the first end being attachable to the base and a weighted object being attached to the second end.

In accordance with again a further feature of the invention, the tape is made of a washable cloth material.

In accordance with still a further feature of the invention, the base is provided with a means for obstructing the pathway of the groove in the base.

In accordance with a concomitant mode of the invention, there is provided a method of taking a photograph of the fish and measuring device, with the fish being located between the tape and the camera so that the length of the fish is recorded on film.

Although the invention is illustrated and described herein as embodied in a device and method for measuring the length of a fish, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
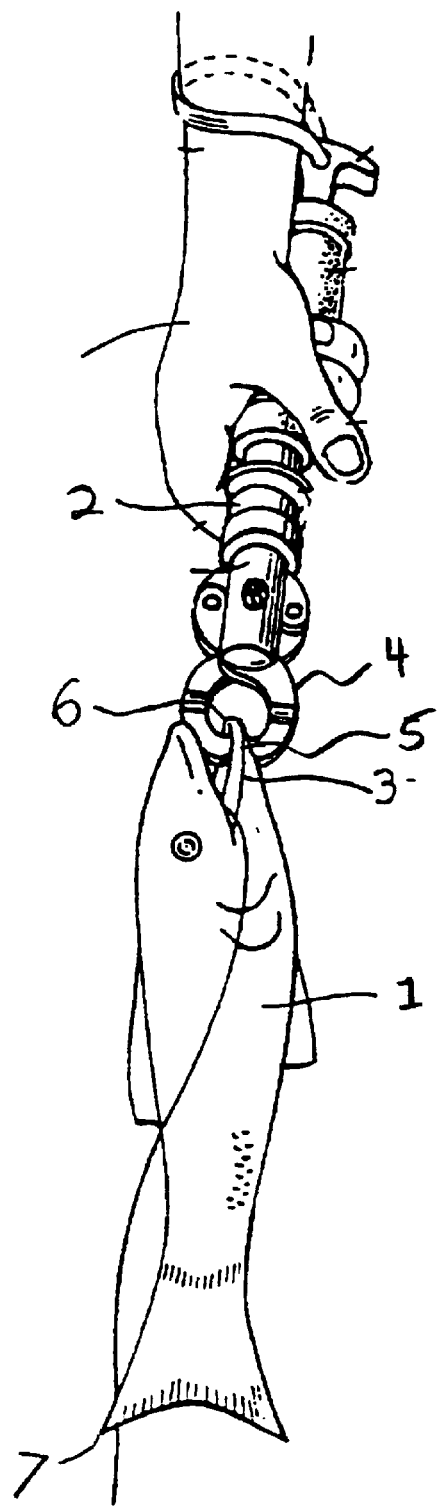
FIG. 1 is a diagram of a fish being held in a fish-holding device.

Referring now to the figures of the drawing in detail, and in particular to FIG. 1, there is illustrated a fish 1 held by the jaws 4 of a holder 2 attached to the lip 3 of the fish 1. The jaws 4 of the holder 2 place pressure at a single point 5 on the lip 3 of the fish 1. Because pressure is only applied at a single point 5, the fish 1 can pivot around the single point 5 and the weight of the fish 1 causes the fish to hang in a vertical orientation, with the edge 6 of the lip 3, defining a first end of the fish 1, directly above the distal tail 7, defining a second end of the fish 1.

Variations on the holding device 2 shown in FIG. 1 can be used to achieve the same result. It is, however, a goal of the invention that the fish 1 be oriented in the same plane and direction as the measuring device 18, which will be described in detail in the proceeding paragraphs.

Figure 2:
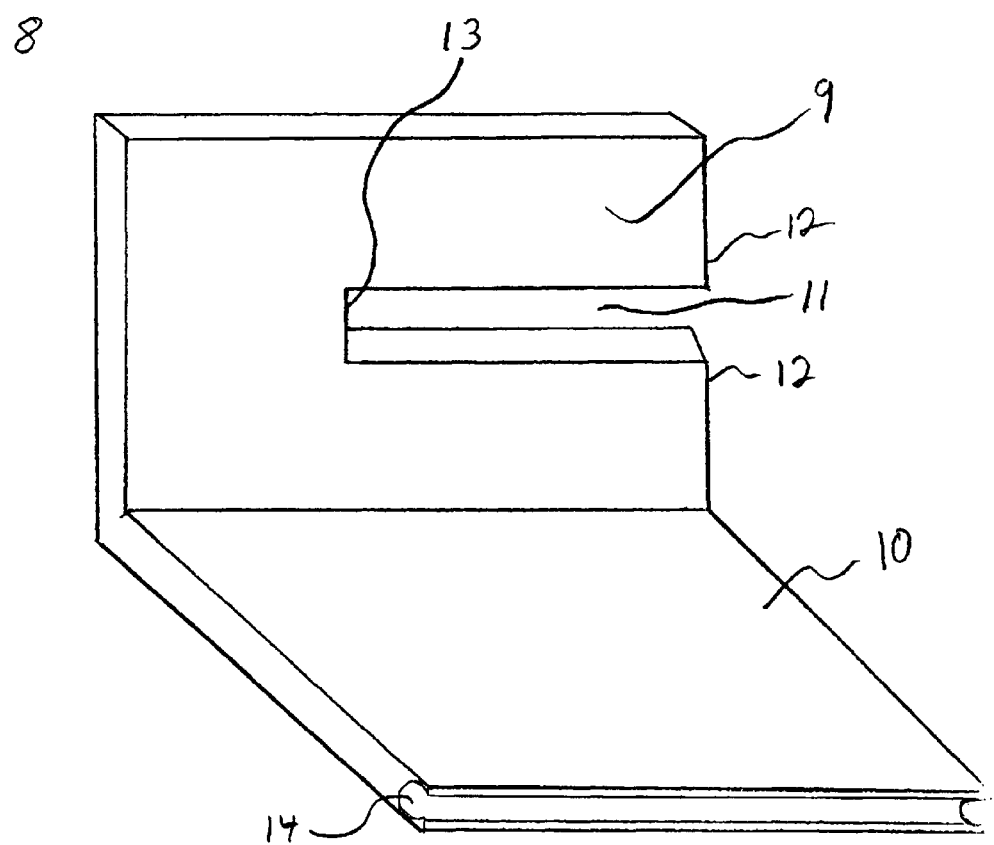
FIG. 2 is diagram of the base of the measuring device.

FIG. 2 shows the base 8 of the measuring device 18. It can be seen from the diagram that base 8 consists of two flat sections 9, 10 joined at an approximately 90 degree angle, forming an "L" shaped configuration. The base can be constructed of almost any material which can maintain the "L" shape and allow for attachment of the measuring tape 15 (to be described below). In a preferred embodiment, the base material is aluminum, which is inexpensive, durable, and resistive to rust when exposed to salt water.

As shown in FIG. 2, a first section 9 of the base 8 has a finger-shaped groove 11, penetrating entirely through the section 9, and running from one edge 12 of the section 9 to a point near the center 13 of the section 9. The second section 10 of the base 8 is provided with an attachment point 14 for connecting a measuring tape 15 (not shown). The attachment point 14 is shown in FIG. 2 as a tubular slot formed in an end of the second section 10.

Figure 3:
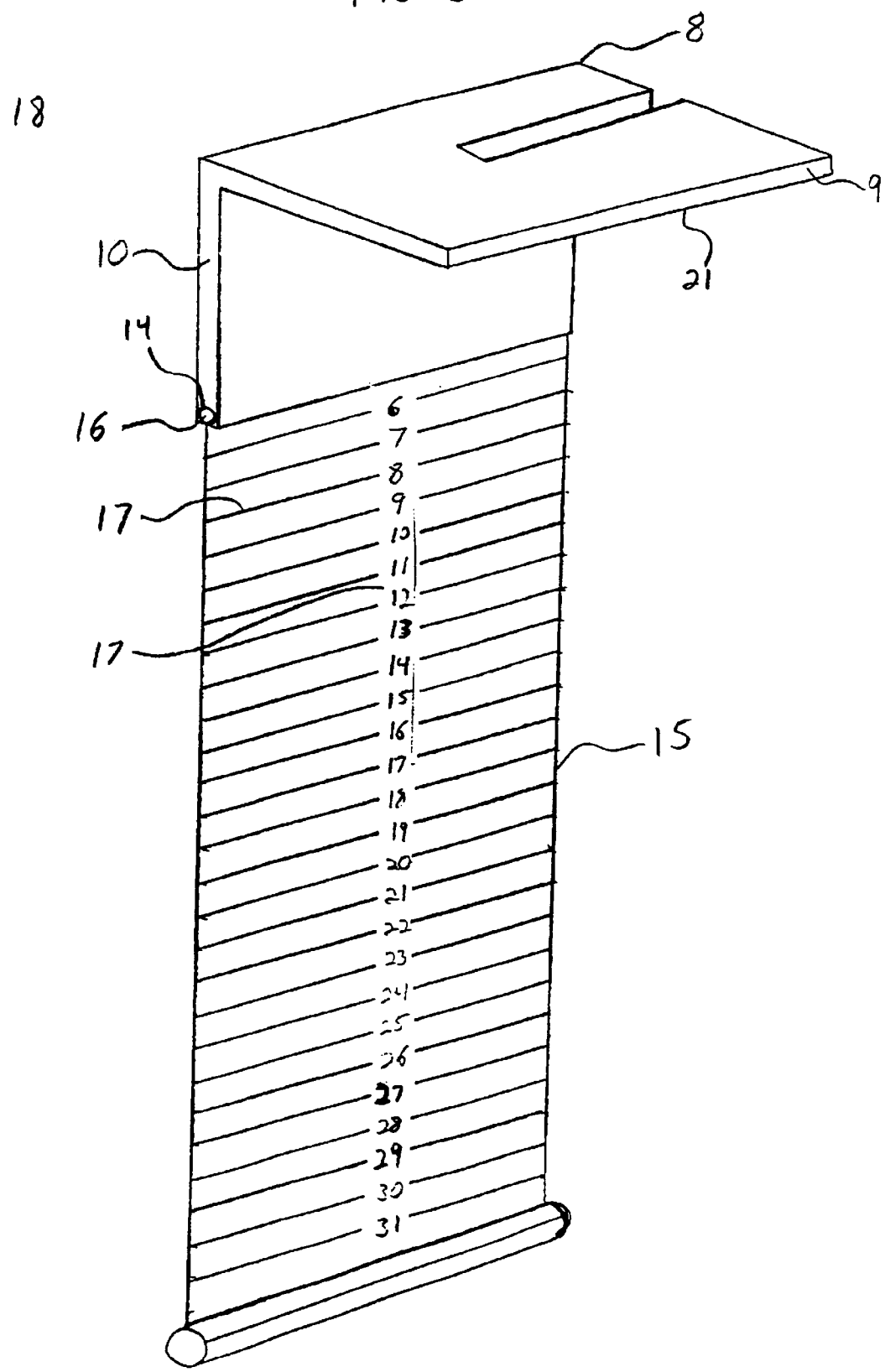
FIG. 3 is a diagram of the measuring tape attached to the base.

FIG. 3 shows the tape 15 attached to the base 8, creating complete measuring device 18. As can be seen in FIG. 3, a tubular-shaped object 16 attached to an end of measuring tape 15 is inserted into slot 14 of base 8. This construction provides the advantage of being able to separate the tape 15 from the base 8 so that the tape 15 can be cleaned or replaced after a long period of use. The ability to separate the base 8 and tape 15 can also provide an advantage for storage space. Although a slot is shown in the diagrams, many other methods of removably attaching the pieces may be utilized. Some examples might be Velcro™, interlocking pieces, magnets, etc. It should also be noted that the object of the device can be achieved if the pieces 8 and 15 are permanently attached.

The tape 15 is a flexible ribbon-like material that attaches to the base 8. The tape 15 can vary widely in materials and can be provided in multiple lengths, depending on the predicted length of the objects to be measured. In a preferred embodiment, the tape 15 is at least several inches wide and has incremented scale markings 17 indicating distances from a zero point on the tape, much like a common yardstick. The scale markings 17 are shown in FIG. 3 as spanning from one edge of the tape 15 to the opposite edge, except for an area in the center of the tape where incremented numerals are printed. It should be noted that the downward facing surface 21 of section 9 is the zero mark for measuring a fish 1. Therefore, the first number marking on tape 15 must factor in the length of section 10.

In a preferred embodiment, the tape and scale markings 17 will be highly contrasting colors, making measurement determination possible from at least several feet away. By selecting a tape material that is flexible, the device can be easily compacted simply by rolling or folding the tape 15 into a small area near the base 8.

Figure 4:
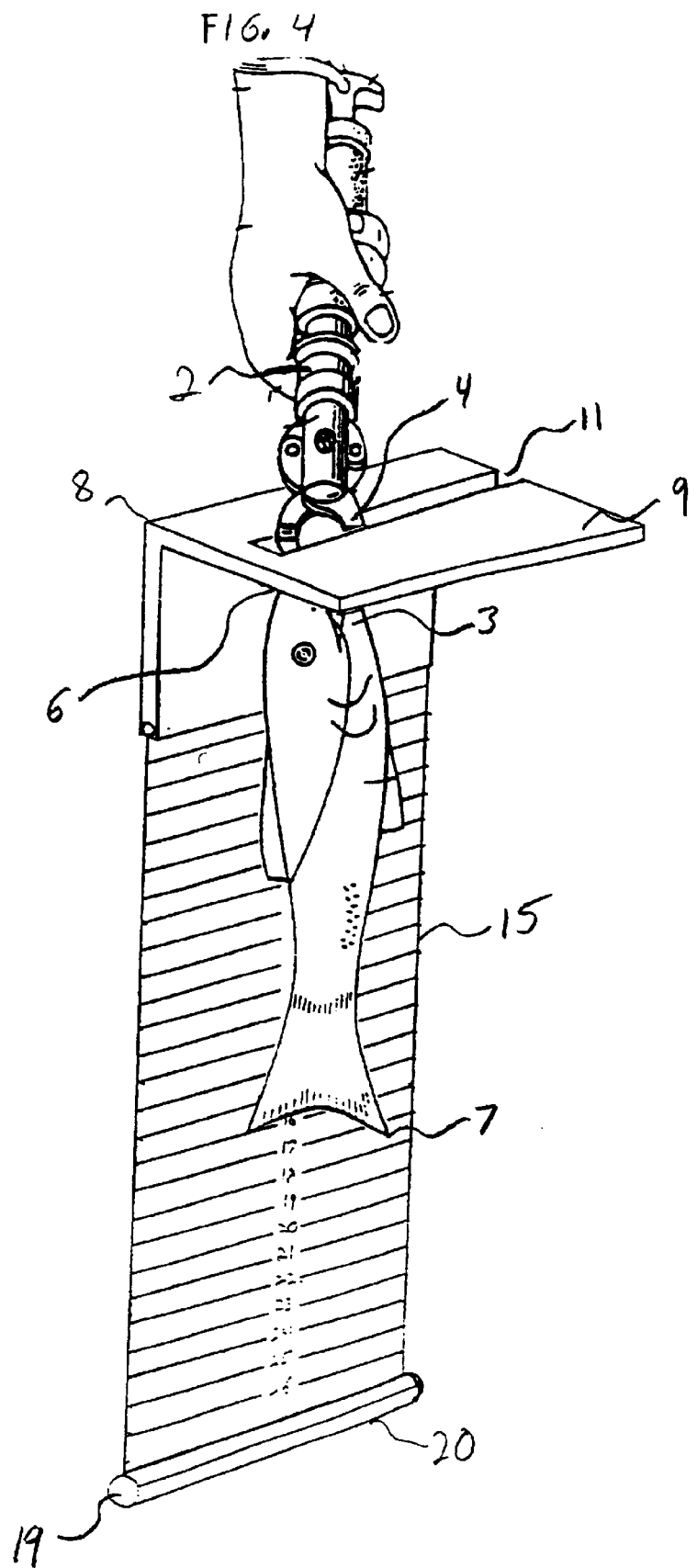
FIG. 4 is a diagram of the base and measuring tape attached to a fish-holding device.

The measurement device 18 is utilized by orienting the first section of the base 9, having the groove 11, in a mostly horizontal plane and the second section 10 to which the tape 15 attaches is positioned in a vertical, downward pointing direction. This orientation is shown in FIG. 4. By sliding the groove 11 in the horizontal section 9 of the base 8 around the clamping jaws 4 of the holding device 2, the base 8 can rest on the uppermost point 6 of the fish's mouth 3, which is the zero point for the measurement. It should be noted that although a groove 11 is described as a means of attaching the base 8 to the holder 2, a variety of other methods exist with which to attach the base, or even the tape directly, to a fish holder 2, while still achieving the same object.

Gravity causes the tape 15, which is attached to the base 8, to hang in the same downward direction as does the fish 1 hanging from the holder 2. To ensure that the tape remains in a downward direction, even in windy conditions, the bottom section 20 of tape 15 can be provided with a weighted object. A tubular object 19 sewn into the end 20 of tape 15 is shown in FIG. 4. The weight could also be clipped onto the tape 15 at any point along its length. Other methods of attaching the weight can be just as effective.

An observer looking at the fish 1, with the tape 15 in the background, i.e., with the fish 1 between the observer and the tape 15, can easily see at what marking 17, along the length of the tape 15, the tail of the fish 7 ends, defining the length of the fish 1. By selecting a marking 17 color that is highly contrasting with the selected tape 15 color, the measurement will be easily discernable from a significant distance away from the fish and tape.

The length of the fish 1 can then be noted mentally, recorded in a separate record book, or, as is an advantage of the present invention, a photograph may be taken of the fish 1. Because the color of tape 15 and markings 17 has been selected so as to contrast with one another, and the markings are selected of a sufficient size, the markings 17 on the tape 15 will be easily captured by the film for later review.

Figure 5:
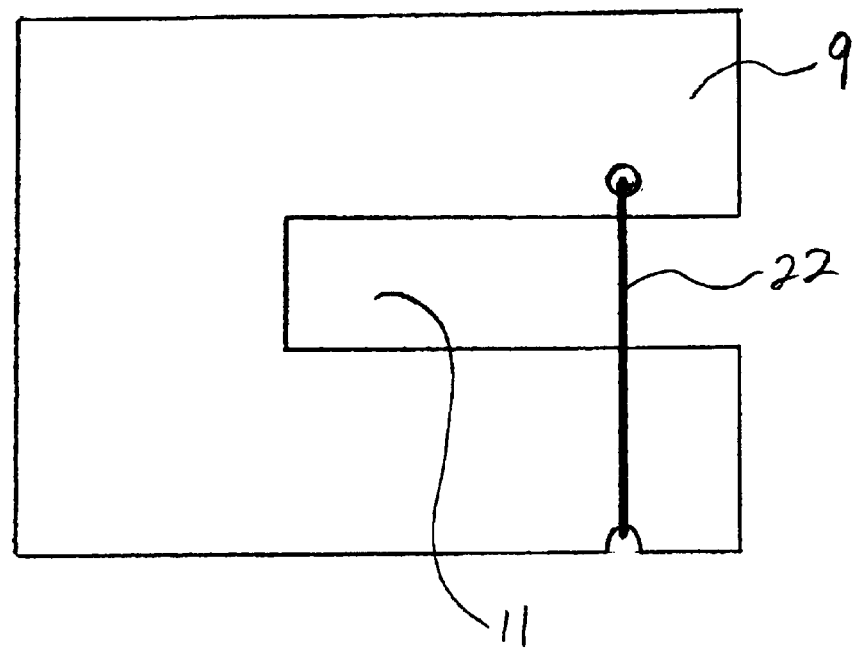
FIG. 5 is a diagram of the base with a securing cord bridging the groove.

In accordance with an additional feature of the present invention, and as shown in FIG. 5, base 8 can be provided with a strap 22 which can be used to ensure that base 8 does not become detached from holder 2. In a preferred embodiment, strap 22 is elastic material that can be stretched around the outside edge of section 9 and prevents the holder 2 from exiting the slot 11 of base 8. It should be noted that there are many other configurations and materials that can be used for obstructing the pathway of the groove 11 and thereby preventing the base 8 from falling off of holder 2. For instance, the width of the groove can be reduced near the opening, a door-type piece can be provided near the opening of the groove, the groove can be formed in a zigzag-type pattern, or any other similar method may be utilized.

While the object of the invention is to provide a way to easily measure and/or record the length fish, the device 18 is not limited to only the measurement of fish. The device 18 can be used to measure an almost unlimited number of other objects in a manor similar to that described in the preceding paragraphs.

I claim:

1. A device for measuring the length of a fish that is attached to a fish holder, the device comprising:
    a base including a first section that is oriented in a mostly horizontal plane, a downward-facing surface of the base being the zero mark for measuring the fish;
    a foldable measuring tape having distance indicators along the length of said tape, a first end of said tape being attached to the base; and
    an opening that penetrates completely through the first section of the base such that the fish holder can be inserted into the opening while the fish is attached to the fish holder, so that gravity causes the foldable measuring tape and the fish to hang in the same downward direction.

2. The device as recited in claim 1, wherein the opening is a groove penetrating completely through the base and extending from an edge of the base toward a center area of the base.

3. The device as recited in claim 1, wherein the base is provided with a means for obstructing the opening.

4. The device as recited in claim 1, wherein said distance indicators are evenly-spaced lines along the length of said tape.

5. The device as recited in claim 1, wherein the distance indicators include evenly spaced lines and incremented numbers.

6. The device as recited in claim 1, wherein the color of said distance indicators is selected so as to contrast with the color of said tape.

7. The device as recited in claim 1, wherein the foldable measuring tape is repeatably removably and attached to the base.

8. The device as recited in claim 1, wherein said tape is made of a washable cloth material.

9. The device as recited in claim 1, wherein said tape is made of a washable plastic material.

10. The device as recited in claim 1, wherein the base further comprises:
    a second section joined at an approximately 90 degree angle to the first section so as to form an "L" shape.

11. The device as recited in claim 10, wherein:
    the first end of the foldable measuring tape is attached to the second section of the base.

12. The device as recited in claim 1, further comprising:
    a weight attached to the second end of the foldable measuring tape.

13. A method of measuring a fish comprising:
    holding a fish at a first end with a holding device;
    inserting the fish and holding device into an opening in a horizontally-oriented section of a measuring device so that the first end of the fish is aligned with a downward-facing surface of the measuring device;
    providing a flexible measuring tape that is attached to the measuring device so that gravity causes the measuring tape and the fish to hang in the same downward direction with the fish being positioned between the tape and an observer; and
    visually determining the length of the fish by comparing a distal second end of the fish to distance indicators provided on the tape.

14. The method according to claim 13, further comprising taking a photograph of the fish, measuring device, and measuring tape, with the fish being located between the tape and a camera so that the length of the fish is recorded.

15. A device for measuring the length of a fish that is attached to a fish holder, said device comprising:
    a base including first and second sections joined at an approximately 90 degree angle so as to form an "L" shape, the first section of the base being oriented in a mostly horizontal plane and a downward facing surface of the first section of the base being the zero mark for measuring the fish;
    a foldable tape section having distance indicators along the length of said tape, the second section of the base being attached to one end of said foldable tape section; and
    an opening that penetrates completely through a portion of the first section of the base such that the fish holder can be inserted into the opening while the fish is attached to the fish holder, so that gravity causes the foldable tape section and the fish to hang in the same downward direction.

16. The device as recited in claim 15, wherein the base includes a means for obstructing the opening so as to prevent the fish holder from exiting the opening.

17. The device as recited in claim 15, wherein the distance indicators include evenly spaced lines and incremented numbers.

18. The device as recited in claim 15, wherein the color of the distance indicators is selected so as to contrast with the color of the tape.

19. The device as recited in claim 15, wherein the tape is repeatedly removably attached to the base.

20. The device as recited in claim 15, wherein the tape is made of one of a washable cloth material and a washable plastic material.

* * * * *